UNITED STATES PATENT OFFICE.

HANS GOLDSCHMIDT, OF ESSEN-ON-THE-RUHR, GERMANY.

MANUFACTURE AND USE OF FERROSOFERRIC OXID.

1,075,709.

Specification of Letters Patent. Patented Oct. 14, 1913.

No Drawing. Application filed March 4, 1911. Serial No. 612,200.

*To all whom it may concern:*

Be it known that I, HANS GOLDSCHMIDT, subject of the King of Prussia, German Emperor, and resident of Essen-on-the-Ruhr, in the Province of the Rhine, German Empire, have invented certain new and useful Improvements in and Relating to the Manufacture and Use of Ferrosoferric Oxid, of which the following is a specification.

It has not hitherto been possible to produce directly upon a technical scale a pure ferroso-ferric oxid which can be advantageously used for the purposes of the art. As is well known, large quantities of magnetic iron stone or iron ore (magnetite) occur in nature, but this material usually contains a rather large proportion of gangue and other impurities. From this material it is impracticable to obtain the magnetic or ferrosoferric oxid in a pure state, even by magnetic separation since the gangue and impurities are usually so intimately distributed as to be contained even in the smallest particles which can be produced. This is true of the mechanical impurities present and also of chemical impurities which, of course, cannot be separated by magnetic treatment. The natural magnetite usually contains phosphorus and sulfur. Attempts have been made to produce ferroso-ferric oxid from purple ore ($Fe_2O_3$) and other iron oxids, but for this purpose it is necessary to melt the material in an electric furnace and the material remains impure. And the physical form of melted and comminuted material of this kind is not as desirable as it should be for many purposes.

It has been found possible to produce a very pure ferroso-ferric oxid from iron scale or forge scales which are obtained, as is well known, in large quantities as a by-product in the rolling and working of iron and steel; as in rolling rails, making wire, etc. In the present invention, forge scale or iron scale of this character is employed.

Forge scale or iron scale consists mainly of oxids of iron but also contains a large amount of impurities; and hitherto it has been employed mostly as an addition to the charge of blast furnaces; an addition which is usually regarded, in the art, as of inferior value. The mechanical impurities of the scale chiefly consist of mill dust containing silica or sand, argillaceous materials (dirt or clay), oil, etc. Frequently the scale also contains metallic impurities such as small particles of iron. The composition of scale varies greatly with the source and with the manner of production. It is however, a low grade material. In the present invention such scale is treated to free it of all impurities and to produce a uniform product containing a uniform amount of oxygen. A uniform product of this kind, free of mechanical impurities and containing a uniform amount of oxygen and in the physical form of iron scale, is found to be particularly suitable for employment as a constituent of the so-called "thermit" mixtures; that is mixtures of powdered aluminum or other reducing metals or alloys with oxid of iron which when ignited give by interaction a pure, highly heated, molten iron.

In the most advantageous embodiment of the present invention, the crude scale is first heated to drive off oil and water, to oxidize particles of iron present, to make the oxygen content uniform and to remove various impurities such as sulfur. This heating should be a calcining or roasting operation. Advantageously the material is heated with an oxidizing flame. The scale is apt to contain a considerable amount of sulfur, and particularly if the iron from the rolling of which the scale was derived had been previously pickled with sulfuric acid; as is often the case. This sulfur, it is found, is entirely removed in calcining the scale in the manner indicated. In the calcination the organic matter (dust, oil, etc.) is also entirely removed and metallic iron is oxidized. After this treatment it is advantageous to sift the scale and, usually, to subject it to a magnetic separation in order to remove mechanically admixed sand. From scale treated in the described manner it is often possible to obtain 60 to 80 per cent., and frequently even more than 80 per cent., of pure ferroso-ferric or magnetic oxid of nearly 100 per cent. purity and substantially corresponding to the formula $Fe_3O_4$. This product is, as stated, very uniform. The several particles of the material are not in granular form, as is the case with comminuted natural magnetite or products obtained by fusion but are in the form of fine lamellæ; they retain the physical form of the mill scale. This physical form of the product makes it particularly suitable for employment as a component part of thermit admixtures. The scale-like particles undergo a better reaction with aluminum powder. To make such a thermit admixture the purified calcined ferroso-ferric oxid obtained may be simply mixed with aluminum powder or other metals or alloys capable of reducing it.

What I claim is:—

1. In the manufacture of ferroso-ferric oxid, the process which comprises calcining mill scale in an oxidizing atmosphere.

2. In the manufacture of ferroso-ferric oxid, the process which comprises calcining mill scale in an oxidizing atmosphere and subjecting the product to a purifying operation to remove impurities.

3. In the manufacture of ferroso-ferric oxid, the process which comprises calcining mill scale in an oxidizing atmosphere and subjecting the product to a purifying operation to remove impurities, said purifying operation comprising a magnetic separation.

4. In the manufacture of ferroso-ferric oxid, the process which comprises calcining mill scale by an oxidizing flame.

5. The process which comprises calcining mill scale in an oxidizing atmosphere, purifying the calcined product and admixing the product with a powdered reducing metal.

6. The process which comprises calcining mill scale in an oxidizing atmosphere, purifying the calcined product and admixing the product with powdered aluminum.

7. A material comprising a substantially pure ferroso-ferric oxid having substantially the composition $Fe_3O_4$ and in lamellar form.

8. A material comprising a mixture of pure ferroso-ferric oxid having the lamellar form of iron scale and a powdered reducing metal.

HANS GOLDSCHMIDT. [L. S.]

Witnesses:
CHAS. J. WRIGHT,
ALFRED HENKEL.